United States Patent
Ross et al.

(10) Patent No.: US 6,873,945 B2
(45) Date of Patent: Mar. 29, 2005

(54) ROCKET MOTOR PROPELLANT TEMPERATURE SIMULATOR

(75) Inventors: Jonathan R. Ross, Waldorf, MD (US); Conan R. Schultz, New Carrollton, MD (US); Michael K Oetjen, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 767 days.

(21) Appl. No.: 09/853,076

(22) Filed: Dec. 18, 2000

(65) Prior Publication Data

US 2002/0077794 A1 Jun. 20, 2002

(51) Int. Cl.$^7$ .............................. G06G 7/48; F02K 9/00; F02K 9/08; F02K 9/70; F42B 8/00
(52) U.S. Cl. .............................. 703/7; 60/253; 60/254; 60/255; 60/256; 73/35.15; 73/167; 102/381; 102/444; 702/99; 374/100
(58) Field of Search ........................ 703/7; 60/253–256; 73/35.15, 167; 102/381, 444; 702/99; 374/100; 202/380

(56) References Cited

U.S. PATENT DOCUMENTS

| | | | | |
|---|---|---|---|---|
| 3,201,973 A | * | 8/1965 | Fitzgerald et al. | 73/35.15 |
| 3,392,524 A | * | 7/1968 | Caveny | 60/39.47 |
| 3,839,861 A | * | 10/1974 | Herz | 60/234 |
| 3,973,397 A | * | 8/1976 | Chase et al. | 60/253 |
| 4,202,668 A | * | 5/1980 | Sippel et al. | 44/272 |
| 5,364,186 A | * | 11/1994 | Wang et al. | 374/126 |
| 5,579,636 A | * | 12/1996 | Rosenfield | 60/251 |
| 5,624,189 A | * | 4/1997 | Vottis et al. | 374/141 |
| 6,342,186 B1 | * | 1/2002 | Wingfield et al. | 422/102 |

FOREIGN PATENT DOCUMENTS

GB 2187267 A * 9/1987 ............. F42B/8/00

OTHER PUBLICATIONS

Nowicki, A. "Earth–to–Orbit Transportation Bibliography", Cited page: "Chemical Rocket Launcher". Mar. 20, 1999. http://lifesci3.arc.nasa.gov/SpaceSettlement/Nowicki/SPBl1TI.HTM.*

Dictionary.com definitions for "Simulate", in particular from Webster's Revised Unabridged Dictionary, © 1996, 1998 MICRA, Inc. http://dictionary.reference.com/search?q=simulate.*

* cited by examiner

Primary Examiner—Kevin J. Teska
Assistant Examiner—Ayal Sharon
(74) Attorney, Agent, or Firm—Fredric Zimmerman

(57) ABSTRACT

The present invention comprises a device which is inert and "thermally-equivalent" to actual ordnance. The device can travel with live ordnance and track the propellant temperatures in order to get a more precise propellant temperature for the ordnance. The device comprises a thermally equivalent inert grain instrumented with thermocouples, connected to a data recorder, and packaged in scaled-down ordnance hardware. The hardware is scaled down to enable the device to more easily travel with live munitions.

13 Claims, 1 Drawing Sheet

ROCKET MOTOR PROPELLANT TEMPERATURE SIMULATOR

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention pertains to a temperature simulator for ordnance propellant. The device comprises a thermally equivalent inert grain instrumented with thermocouples, connected to a data recorder, and packaged in scaled-down ordnance hardware. The purpose of the device is to supply accurate, real-time propellant temperatures from a piece of ordnance to aid in determining the range at which to launch the ordnance.

2. Description of the Related Art

Temperature affects the performance of the energetic materials used in projectiles, missiles, rocket motors, and other ordnance. The current method of projecting the temperature effects on ordnance performance is based upon the temperature conditions under which the ordnance is stored or the temperature conditions under which the ordnance is planned to be used. Under this methodology, it is assumed that the propellant in the ordnance is experiencing those external conditions and has reached a steady state temperature throughout the propellant's cross-section.

There are many problems associated with using this method. First, in many cases, the temperature readings related to the external conditions used are normally taken well before the actual firing of the device. Therefore, the actual conditions under which the ordnance is exposed could vary significantly. Also, it takes a certain amount of time of exposure for any body to reach a steady state temperature related to external forces. When a high degree of accuracy is necessary to complete the mission of the ordnance, it becomes necessary to know the actual temperature throughout the cross-section of the propellant at the time of launch. Thus, using the current method becomes problematic.

One method that has been suggested to replace the above method is to imbed temperature sensing devices directly into live propellant during manufacture and monitor the temperature based upon the sensors. However, this method poses many safety and technical risks, both during the manufacturing process and during field use.

SUMMARY OF THE INVENTION

The present invention comprises a device which is inert and "thermally-equivalent" to actual ordnance. The device can travel with live ordnance and track the propellant temperatures in order to get a more precise propellant temperature for the ordnance. The device comprises a thermally equivalent inert grain instrumented with thermocouples, connected to a data recorder, and packaged in scaled-down ordnance hardware. The hardware is scaled down to enable the device to more easily travel with live munitions.

The present invention is reusable, repairable, highly reliable, and simple, safe, and cheap to manufacture. The present inventions overcomes all of the problems associated with prior art methods as described above.

Accordingly, it is the object of this invention to provide a device which supplies accurate, real-time propellant temperatures for a piece of ordnance.

This invention accomplishes this objective and other needs related to obtaining real-time temperature data for ordnance used in the field.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENT

Figure 1:
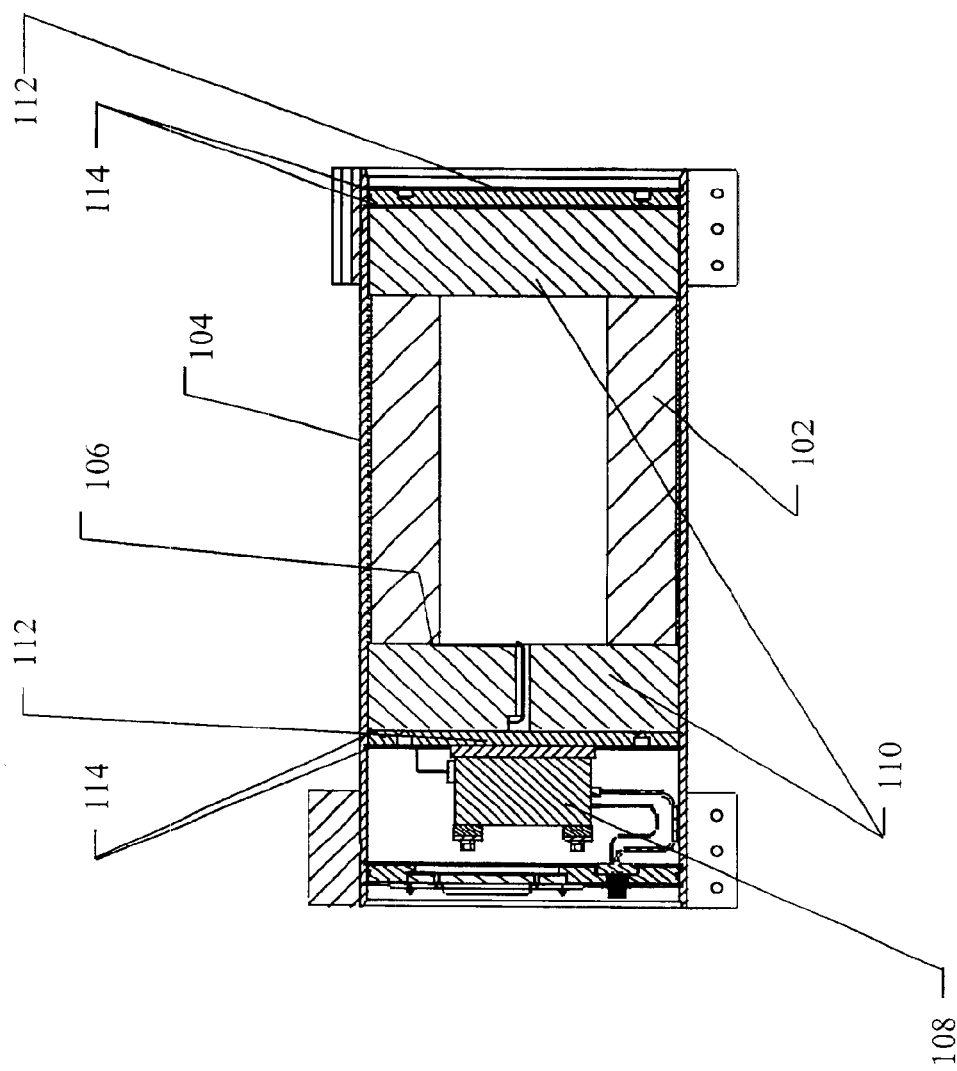
FIG. 1 is a cross-sectional view of an embodiment of the invention.

The invention, as embodied herein, comprises a temperature simulating device for simulating the propellant temperature within live ordnance. The device comprises a propellant assembly and a means for housing the propellant assembly. The propellant assembly comprises a grain simulant that has thermal properties that approximate the thermal properties of the propellant within the live ordnance. The grain simulant is also substantially inert for safety purposes. A temperature measuring means is imbedded into the grain simulant and is connected to a temperature data recording means. This entire assembly is placed within a housing means that simulates the housing of live ordnance so that the affect of external conditions on the temperature simulating device are similar to those on the live ordnance. The temperature simulating device would be stored and transported with the live ordnance so that the external conditions acting on each are the same.

Referring to FIG. 1, a grain simulant 102 is placed within housing means 104. The grain simulant 102 has thermal properties that are similar to the thermal properties of propellant within live ordnance. The grain simulant 102 is also substantially inert for safety purposes. One preferred material for the grain simulant 102 comprises a rubber material. One preferred rubber material comprises hydrin rubber. Testing has shown that hyrdrin rubber comprises thermal properties that are similar to propellant within live ordnance. The cross-sectional area of the grain simulant 102 also approximates the cross-sectional area of the propellant within live ordnance in order to further simulate such propellant. The housing means 104 simulates the housing of live ordnance so that the external conditions acting on the grain simulant 102 remain similar to those that would act upon the propellant within live ordnance. In one preferred embodiment of the invention, the housing materials used to construct the housing means 104 would be the same materials used to house the live ordnance. In another preferred embodiment of the invention, the housing means 104 would be shortened in comparison with the housing for the live ordnance to enable the invention to be more easily stored to travel with the live ordnance.

In one embodiment of the invention, a plurality of temperture measuring means 106 are imbedded into the grain simulant 102. In a preferred embodiment of the invention, there are four temperature measuring means 102. One preferred temperature measuring means 102 comprises thermocouples. A temperature recording means 108 is connected to the plurality of temperature measuring means 106. Any temperature recording device can be selected for the temperature recording means 108 that will operate under the specific conditions to which the invention will be subjected.

In one embodiment of the invention, an insulating material 110 substantially covers the ends of the grain simulant 102 in order to prevent external corrosive or explosive vapors from contacting the internal electronics of the device. The insulating material also prevents thermal transfer to the ends of the grain simulant 102, thereby prohibiting horizontal thermal effects and simulating only vertical thermal effects. Therefore, by using the insulating material 110, the invention gives only a two-dimensional representation of the thermal effects on the propellant in the live ordnance. However, this is normally a sufficient representation to complete the mission. Polystyrene foam comprises one preferred embodiment of the insulating material 110. In another embodiment of the invention, the housing means 104 comprise a rocket motor tube having two end plates 112 that are sealed through retaining rings 114. The retaining rings 114 are preferably snap rings that are designed to held the end plates securely in place. In one preferred embodiment of the invention, the housing means 104 comprises a shortened rocket motor tube so that the device can be more easily transported. In yet another embodiment of the invention an external power source 116 and data output connections 118 for the temperature recording means 108 are connected to an end plate 112.

The present invention also comprises a method of simulating the temperature of the propellant temperature within ordnance. This method comprises the steps of providing the device described above, also providing a means for accessing data compiled by the temperature recording means, and initiating the data accessing means. The data accessing means can be remote to the device in order to ensure the safety of personnel using the device.

What is described are specific examples of many possible variations on the same invention and are not intended in a limiting sense. The claimed invention can be practiced using other variations not specifically described above.

What is claimed is:

1. A temperature simulating device for simulating the energetic material temperature within ordnance wherein the energetic material has thermal properties and a cross-sectional area and the ordnance has housing, comprising:

an energetic material assembly comprising:

a grain simulant, comprising a rubber material, having thermal properties, being inert, wherein the thermal properties of the grain simulant approximate the thermal properties of the energetic material;

means for measuring temperature imbedded into the grain simulant;

means for recording temperature data received from the temperature measuring means; and, means for housing the energetic material assembly wherein the housing means simulate the housing of the ordnance.

2. The temperature simulating device of claim 1, wherein the rubber material comprises hydrin rubber.

3. The temperature simulating device of claim 1, comprising a plurality of temperature measuring means imbedded into the grain simulant.

4. The temperature simulating device of claim 3, comprising four temperature measuring means imbedded into the grain simulant.

5. The temperature simulating device of claim 3, wherein the temperature measuring means comprise thermocouples.

6. The temperature simulating device of claim 1, further comprising a grain simulant cross-sectional area approximate to the energetic material cross-sectional area.

7. The temperature simulating device of claim 6, further comprising first and second ends of the grain simulant and an insulating material covering the first and second ends.

8. The temperature simulating device of claim 7, wherein the insulating material comprises a polystyrene foam.

9. The temperature simulating device of claim 8, wherein the housing means comprises:

a rocket motor tube;

two end plates covering the insulating material; and, two retaining rings that attach the end plates to the rocket motor tube.

10. The temperature simulating device of claim 9, wherein the rocket motor tube comprises a shortened rocket motor tube.

11. The temperature simulating device of claim 7, further comprising:

an external power source for the temperature recording means connected to an end plate; and, data output connections for the temperature recording means connected to an end plate.

12. A method of simulating the temperature of the energetic material temperature within ordnance wherein the energetic material has thermal properties and a cross-sectional area and the ordnance has housing, comprising the steps of:

providing a device comprising an energetic material assembly comprising a grain simulant, comprising a rubber material, having thermal properties, being inert, wherein the thermal properties of the grain simulant approximate the thermal properties of the energetic material, means for measuring temperature imbedded into the grain simulant, means for recording temperature data received from the temperature measuring means, and, means for housing the energetic material assembly wherein the housing means simulate the housing of the ordnance;

providing means for data accessing for data compiled by the temperature recording means; and, initiating the data accessing means.

13. The method of simulating temperature of claim 12, wherein the data accessing means comprises a location remote to the device.

* * * * *